United States Patent
Bonaiti

(10) Patent No.: US 9,796,472 B2
(45) Date of Patent: Oct. 24, 2017

(54) AUTOMATIC SYSTEM OF STABILISATION OF SUSPENDED LOADS WITH AUTOMATIC CONTROL

(75) Inventor: Marco Bonaiti, Lecco (IT)

(73) Assignee: KONG S.P.A., Monte Marenzo, Lecco (IT)

( * ) Notice: Subject to any disclaimer, the term of this patent is extended or adjusted under 35 U.S.C. 154(b) by 85 days.

(21) Appl. No.: 14/422,887

(22) PCT Filed: Aug. 30, 2012

(86) PCT No.: PCT/EP2012/003636
§ 371 (c)(1),
(2), (4) Date: Feb. 20, 2015

(87) PCT Pub. No.: WO2014/032679
PCT Pub. Date: Mar. 6, 2014

(65) Prior Publication Data
US 2015/0191247 A1   Jul. 9, 2015

(51) Int. Cl.
*B64D 1/22* (2006.01)
*G05D 13/02* (2006.01)
*G05D 13/62* (2006.01)
*G05D 1/08* (2006.01)

(52) U.S. Cl.
CPC ............. *B64D 1/22* (2013.01); *G05D 1/0858* (2013.01); *G05D 13/02* (2013.01); *G05D 13/62* (2013.01)

(58) Field of Classification Search
CPC ................................ B64D 1/22; G05D 1/0858
See application file for complete search history.

(56) References Cited

U.S. PATENT DOCUMENTS

| 4,601,444 A * | 7/1986 | Lindenbaum ............. B64B 1/24 244/2 |
| 4,695,012 A * | 9/1987 | Lindenbaum ............. B64B 1/24 244/137.4 |
| 5,069,400 A | 12/1991 | Kovaletz |
| 6,517,131 B1 | 2/2003 | Haataja |

(Continued)

*Primary Examiner* — Philip J Bonzell
*Assistant Examiner* — Michael B Kreiner
(74) *Attorney, Agent, or Firm* — John Alumit

(57) ABSTRACT

The present invention relates to an automatic system suitable for reducing the speed of rotation of one or more suspended loads, preferably where said rotation is originated by the flow tube located downstream preferably of the blades of the helicopter whereto said loads are attached, or by any other cause, and whose mechanical operation is based on the use of at least one aerodynamic surface, which automatically positions so as to exert, through the actual interaction with this flow tube, an aerodynamic moment, with respect to the center of mass of these suspended loads, appropriately contrary to said speed of rotation, so as to determine the slowing and therefore the progressive stabilization thereof. The automation of this deceleration is obtained through the use of a cycle of automatic control which is based primarily on the interaction, obtained with a processor, between an element responsive to said speed of rotation and an actuator capable of rotating said aerodynamic surface. Said system may be particularly useful in helicopter rescue operations, especially during the phase of ascent of the suspended load, mainly consisting of a rescuer, stretcher and injured person lying on the same.

12 Claims, 6 Drawing Sheets

(56) References Cited

U.S. PATENT DOCUMENTS

| | | | | |
|---|---|---|---|---|
| 7,887,011 B1* | 2/2011 | Baldwin | ............... | B64C 37/02 |
| | | | | 244/118.1 |
| 8,371,525 B2* | 2/2013 | Haggard | ............... | B64D 1/22 |
| | | | | 244/1 TD |
| 9,079,664 B2* | 7/2015 | Haggard | ............... | B64D 1/00 |

* cited by examiner

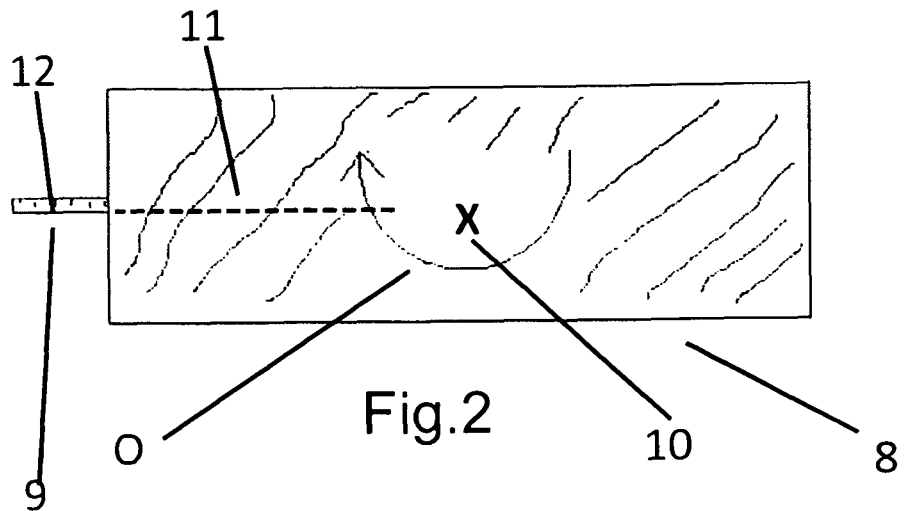
Fig.2
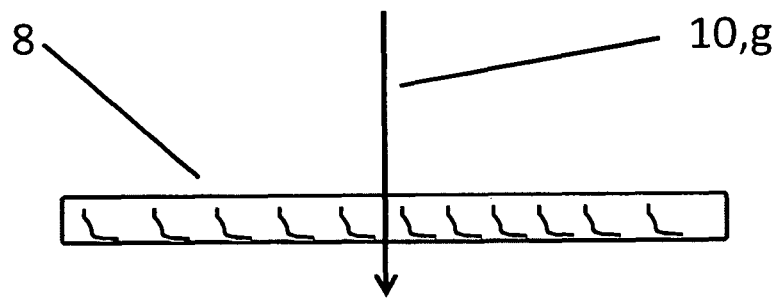
Fg.3a
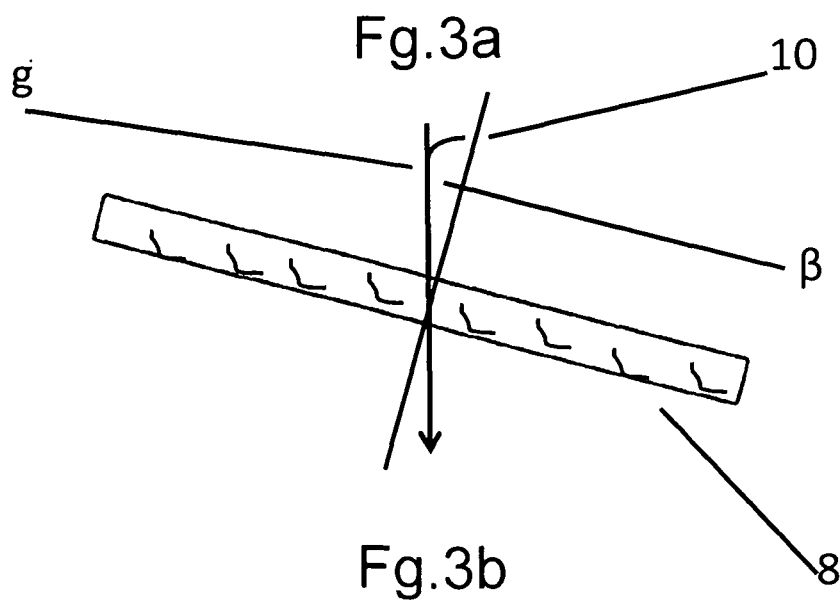
Fg.3b

AUTOMATIC SYSTEM OF STABILISATION OF SUSPENDED LOADS WITH AUTOMATIC CONTROL

The present invention relates to an automatic system suitable for reducing the speed of rotation of one or more suspended loads, preferably where said rotation is originated by the flow tube located downstream preferably of the blades of the helicopter whereto said loads are attached, or by any other cause, and whose mechanical operation is based on the use of at least one aerodynamic surface, which automatically positions so as to exert, through the actual interaction with this flow tube, an aerodynamic moment, with respect to the centre of mass of these suspended loads, appropriately contrary to said speed of rotation, so as to determine the slowing and therefore the progressive stabilisation thereof. The automation of this deceleration is obtained through the use of a cycle of automatic control which is based primarily on the interaction, obtained with a processor, between an element responsive to said speed of rotation and an actuator capable of rotating said aerodynamic surface. Said system may be particularly useful in helicopter rescue operations, especially during the phases of ascent or descent, respectively, of the suspended load, especially if it consists of a rescuer, stretcher and injured person lying on the same.

First of all, as regards the present application, it is pointed out that:

- the term "angular velocity" should not be understood in its strict scientific sense, which can then be related only to a perfectly rigid material system, but more generally as a vector whereof at least one component is at least partially dependent, mathematically and/or physically, on the rotary part of the generic motion of a system of point masses, said rotary part consisting of a rotation around at least one axis which may also be variable in time. In fact, for reasons of structural deformation and/or because of the possible relative movements between the various parts of the suspended load to be stabilized, the hypothesis of perfect rigidity of this suspended load is practically never fulfilled;
- the term "vector" means, as is known, a mathematical entity containing one or more components, which can be physical quantities;
- each symbol relative to a vector, in the detailed description, will be denoted with an underlined letter, it being understood that, also in this case, this vector could be composed of a single component and therefore be a simple scalar or a vector with one component;
- the term "moment" indicates the physical action intending to impart a rotation, or in any case to vary the relative angular moment and/or the angular velocity of a system of point masses, and that mathematically and at a dimensional level it is the result of the multiplication of a force by a displacement, so that this moment could also indicate a pure torque originated by a system with no net force;
- the term "load" or "suspended load", is to designate the combination of the stretcher and all that is in some way constrained to move together with it, as well as the rescuer and/or the injured person, as well as the instruments constituting the system of stabilisation, although the following physical-mathematical concepts still apply, also in the case where only the stretcher, or another load of any kind, is considered as the suspended load;

in any case, with regard to the object that this application is intended to protect, and in particular the content of the claims, this term "load" or "suspended load" may also identify any system of point masses, at least partially balanced by at least one means suitable for this purpose, in the direction of the force of gravity, said system of point masses then being able to be possibly consisting of several foreign bodies.

On examining more particularly the case wherein the suspended loads are attached to a helicopter, for example via a cable connected to the relative winch, or possibly barycentric hook, it is to be remembered that, in order to create the necessary lifting force, the disk of the blades of the helicopter imparts on the relative wind entering the disk itself a certain variation of speed, because of which, at least downstream of said blades, a kind of flow tube directed downwards forms. Any mass, coming to be found in this flow tube, is therefore subject to physical actions resulting from a certain distribution of aerodynamic stresses on the surface of the same, which may therefore alter the action of motion relative to at least part of it.

In particular, this occurs frequently during the phase of ascent and/or descent in the helicopter operations, during which the suspended load, which is constituted, for example but not exclusively, by the stretcher, the injured person and the rescuer, is subject, under the influence of this flow tube, to at least one motion of rotation, roughly around the support cable, and which can be characterised by a speed of rotation or angular velocity, even very intense. Said rotation can cause physiological decompensation of the rescuer and/or of the injured person, due to the centrifugal effect that is created inside the body of the same.

In fact, a person in some way constrained to follow the rotation of the stretcher, and for example positioned in a radial direction with respect to this rotation, is subject, as is known, to a movement of the blood in the direction of head-foot, or vice versa, which can be the potential cause of even very dangerous cardiac decompensation.

Thus studies have been carried out on some systems able to allow the rescuer to avoid this possible disadvantage, by means of which the possibility is achieved of reducing the angular velocity of the suspended load, in this case created by the stretcher and all that is at least partially constrained to rotate together with it.

One of these is constituted by the device described in patent application FR 2922437, which involves the use of an extractable flap, preferably in plastic, able to generate, due to the aerodynamic effect, a moment intending to rotate the stretcher in reverse direction compared to that induced by the flow tube generated by the blades of the helicopter, hereinafter simply referred to "flow tube". The rescuer, to this end, can regulate the inclination and orientation of this flap, according to the direction and the course of the wind speed relative to the same, so that an aerodynamic force is generated such as to slow down the angular motion of the stretcher.

Another system, presented in the patent application WO 2008/131081, consists of the use of a sail, attached to the stretcher so that it can be pulled upwards or downwards, and provided with an appropriate hole of variable section, which collects a certain amount of flow of air, so as to generate, again due to the aerodynamic effect, a moment acting on the suspended load.

However such systems require, for operation, the external intervention of the rescuer, who is prevented, in this way, from paying sufficient attention to other operations, in particular as regards the immediate care of the injured person.

The purpose of the present invention is therefore to provide an automatic system of stabilisation of at least one suspended load, preferably for operations of helicopter rescue, which does not require any intervention by the rescuer, so that the latter can deal with adequate attention with the medical assistance for the injured person, even during the phase of ascent towards the helicopter, and/or of descent from the same.

Another widespread system provides for the presence, on the ground, of an additional person provided with another rope, the latter also connected to the stretcher. During the ascent of the stretcher, carrying rescuer and injured person, the person with the rope must try to slow down the angular motion of the stretcher by exerting traction, in the appropriate direction, on said rope.

This system does allow avoidance of the intervention of the rescuer, but may not be used easily when the injured person is located in areas inaccessible or difficult to reach, such as ravines or crevasses may be, or areas in any case particularly steep, such as not to have easy or comfortable support for the person who has to control the rope for stabilisation.

Another object of the present invention is therefore to provide an automatic system of stabilisation of at least one suspended load, preferably for helicopter rescue operations, which can be easily used also for rescue operations in inaccessible areas, such as ravines or crevasses, and which therefore, at least for the purpose of the operation directly intended for said stabilisation, does not require the intervention of any person.

Moreover, the success of the systems described depends in any case on the skill and intuition of the person who controls the system of stabilisation, so that such stabilisation operations are subject to possible human errors.

A further object of the present invention is therefore to provide a system of stabilisation of at least one suspended load, preferably for operations of helicopter rescue, which can be controlled automatically, in such a way as to be able to reduce the risk that possible human errors can affect the success of the operation of stabilisation, and therefore also, at least in part, of the rescue operation.

These objects are achieved by an automatic system of stabilisation thanks to which, on the basis at least of the size of at least one component of angular velocity of the suspended load, a moment tending to stabilise, and then preferably to decrease, the speed of rotation of said suspended load, is generated automatically, preferably by an aerodynamic means.

This system of stabilisation consists mainly of the following components:
- at least one angular velocity sensor, henceforth referred to as "primary sensor", which consists of at least one element sensitive at least to a part of at least one component of the angular velocity vector of at least part of the suspended load;
- at least one software or computer program, which coordinates the various components;
- at least one unit or means of processing, at least partly electrical and/or electronic and/or computer, or processor, which can be considered either hardware or a processor or a microprocessor or the like, whereon said software is at least partially installed and which therefore allows the same software to run, or to function, at least partially;
- said processing means, hereinafter referred to more simply as "processor", being suitable for the digital processing of signals;
- at least one aerodynamic means, intended as a means capable of generating, if impacted by the flow of a fluid, an aerodynamic force resulting from a certain distribution of aerodynamic stresses on the aerodynamic means itself, said stresses thus also giving rise to a moment vector or torque with respect to any point in space;
- said aerodynamic means being at least partially restrained to said suspended load with at least one known means;
- at least one system of movement, in the sense of a system that allows at least one system of point masses to be moved, and at least partially with artificial power supply, such as for example hydraulic, electrical, or pneumatic, or in any case non-human;
- optionally at least one other sensor, hereinafter referred to as "secondary", which consists of at least one element sensitive at least to a part of at least one component of a physical quantity that can be vectorial;
- the latter physical quantity being at least partially dependent physically and/or mathematically on at least one physical event regarding at least part of said aerodynamic means;
- the latter physical quantity being, preferably, mathematically and/or physically at least partially dependent on the inclination, and/or the orientation, of the velocity vector relative to at least part of the air which impacts at least partially said aerodynamic means, said inclination and/or orientation being with respect to a reference direction at least partially integral with the latter;
- at least one conversion device, associated to at least one of said primary and, if present, secondary sensors, able to convert at least one physical quantity, sensed or detected by this primary or secondary sensor, into at least one appropriate electrical and/or electronic signal, so that the combination of at least one of said sensors with said conversion device constitutes the respectively primary or secondary transducer;
- at least one of said primary and secondary transducers being at least partially restrained to said suspended load with at least one known means;
- at least one means of communication, at least partially electrical and/or electronic and/or computer, in the sense of adequate means for allowing the reciprocal interface or interaction, in the sense of the exchange of information or signals preferably electrical and/or electronic and/or computer, after possible analogue/digital conversion or vice versa, of at least one of the following pairs of components:
  said processor and primary transducer;
  said processor and secondary transducer, if the latter is present;
  said processor and system of movement.

Preferably, but not exclusively, the preferred embodiment of the present invention provides that:
- said aerodynamic means is constituted at least partially by at least one aerodynamic surface or wing, characterised at least in part by a certain aerodynamic profile, preferably biconvex and symmetrical; this aerodynamic means could be constituted, also, at least by a fixed or variable pitch propeller, rotating possibly by means of at least one motor of known power supply;
- said system of movement is an actuator or motor with known power supply, at least partially restrained to said wing;

said motor is able to move said wing, preferably by rotating it, by means of at least one member, which may be a shaft, hereinafter referred to as "motor shaft";

said member is at least partially restrained at least to one structural component relative to said wing, and/or at least partially restrained to it;

said structural component, hereinafter referred to as "shaft of the wing," is preferably elongated and at least partially internal to said wing;

said software operates at least partially via at least one programming language;

said primary sensor is a gyroscope, or the like, at least partially restrained to said suspended load;

said secondary sensor is an accelerometer, or the like, at least partially restrained to said suspended load;

said means of communication is constituted at least by any analogue/digital or digital/analogue converter, or the like.

Furthermore, the term processor will be intended to identify, for the sake of simplicity, the set of the computer program or software that allows the device to operate, and the processing means, on which said software is installed.

Preferably, but not exclusively, the preferred embodiment of the present invention operates according to a procedure which performs, preferably cyclically and/or repeatedly, at least one of the following phases, which may be at least partially simultaneous:

the primary transducer senses, and then detects, at least part of at least one component of the angular velocity vector of at least part of the suspended load;

the latter component being preferably referred to an axis integral at least partially both with said primary transducer and said suspended load;

if present, the secondary transducer senses and then detects at least part of at least one component of a physical quantity, possibly vectorial, and at least partially dependent physically and/or mathematically on at least one physical event regarding at least part of said aerodynamic means;

at least part of the detection of said primary transducer, possibly converted into at least one signal, preferably analogue, electrical and/or electronic, is sent towards the processor, as primary input signal;

at least part of the detection of said secondary transducer, possibly converted into at least one signal, preferably analogue, electrical and/or electronic, is sent towards the processor, as secondary input signal;

at least part of at least one of these input signals is optionally converted into digital form, via at least one analogue to digital converter;

the processor processes, at least mathematically and/or logically, at least part of at least one of these input signals;

the processor, therefore on the basis at least of part of at least one of said input signals, sends at least one output signal, which may be in digital form, towards the system of movement;

at least part of this output signal is optionally converted into analogue form, via at least one digital to analogue converter;

on the basis at least of part of this output signal, said means for movement moves, with respect at least to one flow of air, at least part of the aerodynamic means, preferably at least rotating it;

a variation of at least part of the aerodynamic stresses acting on said aerodynamic means is generated, consequently to the movement of the same imparted by said system of movement;

at least part of said aerodynamic stresses, as a result at least of this variation, exert, overall, at least one moment on the suspended load, for example with respect to the centre of mass of the latter;

said moment determines at least one variation, which preferably consists of a reduction, of the absolute value of at least one component of the angular velocity vector relative to at least part of this suspended load, the latter component being preferably at least partially linked, physically and/or mathematically, at least to the component of angular velocity initially sensed by the primary transducer.

Said process, preferably repeatedly and/or cyclically, can also carry out all these phases, preferably at least partially in the sequence presented, or at least two of these phases, preferably at least partially in the sequence presented, said two phases could also be separated by at least another phase, in the latter sequence, the latter another phase could also to be absent in said method. It should be considered that, preferably, the phases of measurement of the transducers, if both present, and of sending of the relative signals in input to the processor, take place at least partially simultaneously.

As will be explained in the example of the detailed description, the processor, preferably but not exclusively, using the detection of the secondary sensor in order to determine, at least approximately, at least the direction of at least part of at least one component of the velocity vector of at least part of the flow of air, which impacts at least partially said aerodynamic means.

It is advisable, however, for this procedure of use to include all phases referred to above and in the sequence presented.

The present device therefore operates in such a way that a reading of angular velocity by the primary transducer, corresponding to a rotary motion of the suspended load in a certain direction, corresponds to the means of movement that arranges the aerodynamic means in such a way that the latter undergoes a variation, relatively to the aerodynamic stresses acting on the same aerodynamic means, such that the movement vector exerted by the same stresses and resulting from this variation, with respect to the centre of mass of said suspended load, is of appropriate modulus, direction and sense and such as to slow down this angular motion. Therefore, very generically, if the load is rotating in an anticlockwise direction, with respect to some observer, the aerodynamic means must position in such a way that the aerodynamic stresses that arise from the contact of the same with the air are able to exert a clockwise moment on the suspended load, which therefore undergoes a substantial slowing of the relative rotational motion.

Another aspect of the present invention consists of the fact that it can also be considered as a system of closed loop control, for stabilisation at the rotation of at least one suspended load, and in particular, preferably but not exclusively, of a stretcher with rescuer and injured person, during the operations of helicopter rescue. In fact, the size of the angular velocity is an item of data in output from the physical system controlled, represented by this suspended load, for example corresponding in fact to the whole of the stretcher with all that is in some way at least partially constrained to move with it, and is in turn used as item of data in input to the processor, which is the controller.

The latter, on the basis possibly also of the input signal coming from the secondary transducer, sends an output signal to the system of movement which, on the basis of this output signal, modifies the arrangement of the aerodynamic means with respect to the flow of air, in such a way as to produce a corresponding variation of the moment vector exerted by said aerodynamic means, with respect to the centre of mass of the suspended load. This angular velocity, directly as a consequence to the latter variation, may vary with respect to the value previously measured by the primary transducer, which will detect the new value, restarting the cycle and closing the control loop.

With the possibility of deducing that the variable measured in output, i.e. the angular velocity, also depends on the control variable in input, which is the physical action which is exerted by the system of movement on the suspended load, the present invention can be considered, at least partially, a system of closed loop control. In fact, the primary transducer, preferably but not exclusively, always measures the component of the angular velocity along a certain axis, which, at least approximately, preferably remains fixed with respect to at least part of the suspended load.

The features of the present invention and of the method whereby it can operate will be made clearer by the following detailed description, whereof the first part is a mathematical-logical explanation of a possible method of use of the preferred embodiment of this invention, hereinafter simply referred to as "preferred embodiment", and the remaining part a presentation of one of its possible mechanical functionings, as well as the relative arrangement of some components. This description is in any case given as a non-limiting example of the more general concepts claimed.

The description refers to the accompanying drawings, in which:

FIG. 2 is a perpendicular view from above of a stretcher rotating, together with the wing for the stabilisation;

FIGS. 3a and 3b are two side views of only the stretcher, respectively in two different physical situations, yet which can both be correlated with the view of FIG. 2;

FIG. 1 shows a possible block diagram relative to the closed loop control system, with which a possible method of use of the preferred embodiment of the present device can be interpreted.

Figure 1:
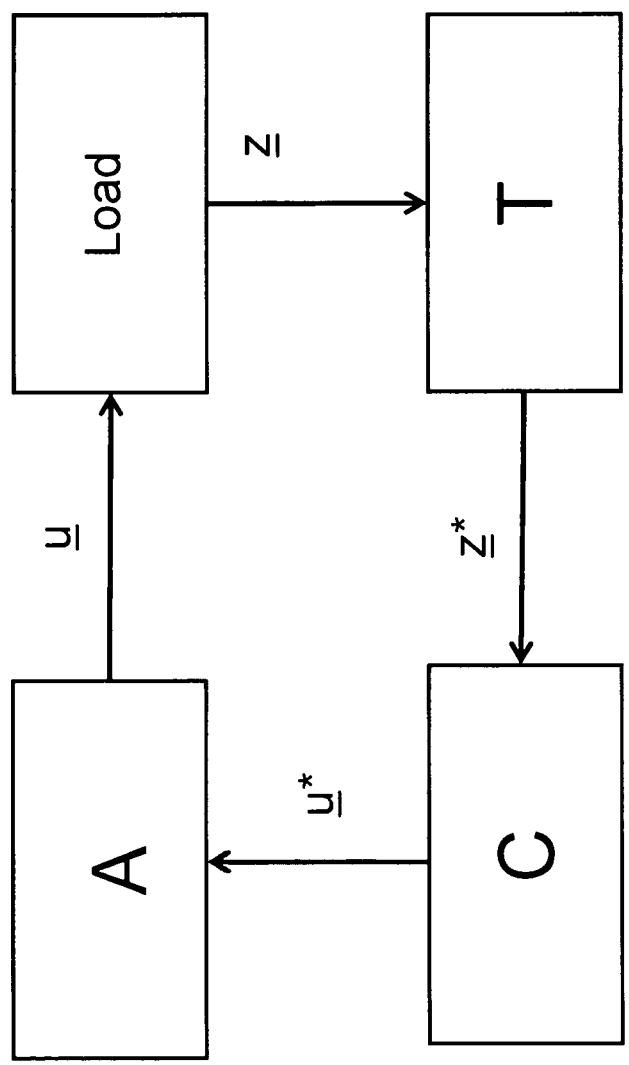
FIG. 1 is a diagram of the control loop whereby the preferred embodiment of the present device can operate.

Referring to FIG. 1, it is noted that:
the "load" block comprises at least the suspended load, therefore also the system of stabilisation itself;
the "transducer" block T may comprise either at least the primary transducer, or at least the primary and secondary transducers, or at least one single transducer which performs the functions of both;
the "controller" block C comprises at least the processor;
the "actuator" block A comprises at least the system of movement;
z refers to the vector of the outputs of measurement, comprising at least one component of at least one physical quantity relating to at least part of the suspended load;
z, at least in a mathematical logic sense, exits from the load and enters the block T;
the block T translates the vector of the measurement outputs z, at least in a mathematical logic sense, into the vector z*, which comprises at least one signal, preferably electrical and analogue, and at least partially dependent at least on one component of z;
T sends, at least in a logical sense, said vector z* towards the block C;
said vector z* therefore constitutes the vector of the signals in input, and is taken therefore in input, by at least one known means, from C, after possible conversion from analogue form to digital form, by means of at least one analogue/digital converter;
C processes this vector of the signals in input z*, performing at least one logical and/or mathematical operation, so as to obtain the vector u*, which comprises at least one preferably digital signal;
C sends the vector u*, at least in a logical sense, towards the block A, which comprises at least the system of movement;
said vector u* constitutes therefore the vector of the signals in output from C, and is therefore taken in input from A, after possible conversion from digital form to analogue form, by means of at least one digital/analogue converter;
block A, at least in a mathematical logic sense, translates the vector of the signals in output u* into the vector of inputs u, which comprises at least one physical action at least partially dependent at least on one component of u*;
A exerts therefore this physical action as per the vector u, on at least part of the aerodynamic means, which can be considered part of the suspended load;
this latter part, by moving, changes arrangement and/or orientation with respect to the flow of air, for example in relation in fact to the flow tube;
at least one physical quantity relative to the vector z, in general, varies, also as a consequence of this change in arrangement and/or orientation of said at least part of the aerodynamic means;
the block T performs the new measurements and the cycle restarts.

One possible method of use of the preferred embodiment provides that:
said vector of the measurements z comprises at least:
 at least part of at least one component of a vector, which is at least partially dependent, mathematically and/or physically, at least on one component of the angular velocity vector of at least one point of said suspended load;
 at least part of at least one component of a vector, which is at least partially dependent, mathematically and/or physically, at least on one component of the acceleration vector of at least one point of said suspended load;
said component of the angular velocity is referred to an axis, at least approximately, integral at least with part of the suspended load;

said acceleration and angular velocity can be considered, at least approximately, with respect to a system of reference which can be considered, at least approximately, inertial, as could be a term of axes integral with the planet Earth;

said components of the angular velocity vector and of the acceleration vector are sensed, or detected, or measured respectively by the primary transducer and by the secondary transducer;

said vector of the inputs u comprises at least one action of rotation, or torque, or moment which the system of movement exerts at least on part of said aerodynamic means.

In order to implement said preferred method, the preferred embodiment of the present invention provides, preferably but not exclusively, that:

said primary transducer comprises at least one gyroscope or the like, preferably digital and/or with full scale of +/−300 degrees per second;

said secondary transducer comprises at least one accelerometer or the like, preferably digital and/or with full scale of +/−3 g;

the frequency with which the measurement outputs are sampled, and therefore the frequency with which the block T acquires at least one item of data relative to at least one physical quantity relative to the suspended load, is preferably approximately 800 Hz, therefore about 800 times per second;

said transducers preferably use, at least in part, nanotechnology;

said aerodynamic means comprises at least part of a wing, preferably with a profile which is constant along the aperture and symmetrical;

said action of rotation, in general, determines a variation of the angle of attack of at least part of the wing, with respect to at least part of the flow of air which impacts it.

Moreover, in the preferred embodiment of the invention, said processor uses the signal in input coming from the accelerometer in order to identify at least the direction of the projection, on at least one section of the wing, of the velocity vector of at least part of the flow of fluid which impacts at least part of said wing, so as to take account of this direction for the calculation of the signal in output to be sent to the system of movement. In fact, the angle of incidence between a reference direction integral with the wing, which usually coincides with the direction of the relative velocity in the case of zero lift, and the direction of the relative velocity, called also angle of attack, must be comprised within a certain range, for example between plus and minus 20 degrees, in order to avoid phenomena of separation of the flow of air from the surface of said wing.

In fact, the logical-mathematical operations performed by the software, in this preferred embodiment and very generically, assume the following hypotheses:

the direction of the force resulting from the surface distribution of aerodynamic stresses on said wing geometrically depends at least in part on the direction of the velocity of the flow which impacts the wing;

for example, said resultant is orthogonal to said velocity, as in the case of the lift generated by thin profiles with high efficiency, for angles of attack that are not too high;

this resultant force can be considered applied along an axis passing through a point, called the centre of pressure, with respect to which this distribution of aerodynamic stresses exerts a zero torque;

the position of this centre of pressure, therefore, determines the moment exerted by this resultant force, and therefore by this distribution of stresses, with respect, for example, to the centre of mass of the suspended load;

there is a certain mathematical relationship between the modulus of this resultant force and the velocity, dependent at least on the angle of attack;

above all, the mathematical relationship between the modulus of said resultant force and the modulus of said velocity is derived from a theory in which the flow is supposed to be attached to the surface of the wing, and therefore does not undergo separation phenomena. It is elementary, therefore, that the occurrence of these phenomena of separation, as a result of a too high angle of attack, undermines the proper working of the system of stabilisation, due to the fact that the processor, which controls the whole system, does not take account of these phenomena. Obviously nothing prevents the processor from also taking account of these phenomena, and therefore the problem of possible angles of attack that are too high does not exist, even if, usually, the separation of the flow is associated with vortex phenomena that are rather complex and difficult to predict, at least in the times of computation allowed in our case.

Another aspect comes from the fact that the appearance of possible separations of the flow from the surface of the wing would directly affect the possibility of the same wing, at a strictly physical level and beyond the operations performed by the software, to position in such a way as to exert a force capable of slowing down the speed of rotation of the suspended load.

Again referring to the use by the processor of the information coming from the accelerometer, it is noted that:

the moment exerted by the wing on the suspended load varies on the basis at least of the angle of attack of the same with respect to the flow of air;

the direction of the velocity of the flow of fluid with respect to the wing, which determines this angle of attack, is assumed by the processor, in the preferred embodiment, as parallel and concordant with the force of gravity;

said angle of attack changes as a consequence of the angular position of the wing with respect to the reference of the actuator, and therefore also, even if in a certain sense mathematically indirectly, to of the torque exerted by this actuator on the same wing;

said torque in turn is dependent on the signal in output from the processor.

Therefore the processor, preferably and very generically, performs at least the following steps:

via at least the signal coming from the accelerometer, it calculates the angular position of the direction of the force of gravity, and therefore of the velocity vector, with respect to the reference of the actuator;

starting from the angle of attack required in order to have the aerodynamic effect desired, calculated on the basis at least of the signal from the gyroscope, it traces the angular position which the wing has to assume with respect to this reference of the actuator, in order that the same wing assumes this required angle of attack;

on the basis of this angular position it sends a specific signal in output to the actuator.

Optionally at least one means can be present for the filtering of at least one signal in input, the latter sent by at least one transducer to the processor and relative to the acceleration or to the angular velocity. Said filter means is preferably suitable for operating on discrete signals, and in this case is preferably integrated directly in at least one of the two transducers, or possibly in the single transducer which performs the function of both. Said filter means, preferably placed directly downstream of at least one of the transducers or possibly of the single transducer, is suitable for eliminating the frequencies either relative to disturbances not of interest, or which in any case are to be eliminated, for example in order to eliminate any problems of aliasing. This elimination, relative to unwanted harmonic components, therefore occurs before said signal is processed by the processor, so that the logical operations performed by the latter do not lead to signals in output not corresponding to that which is required to be obtained on the basis of the program implemented.

FIG. 2 shows, from above, the stretcher 8 with the wing 9 attached, both subject to a possible physical situation consisting of a rotation in the direction of the arrow O, due to the aerodynamic effect of the blades of the helicopter. The latter is supposed to be at a standstill and therefore in hover, as usually occurs during the operations of ascent of the stretcher 8, while this rotation takes place around an axis of rotation 10 perpendicular to the upper face of said stretcher 8, which is supposed, exclusively for the sake of simplicity, to be perfectly rectangular.

Said axis of rotation 10 passes also, for example, through the centre of mass of the stretcher 8, and is denoted by an x, in that entering perpendicularly in FIG. 2. The wing 9 can rotate, in a known manner, around the axis of longitudinal symmetry 11, or roll axis 11, of the stretcher 8. Relative to said wing 9, only the area of the leading edge 12 is visible, while for the sake of simplicity neither rescuer and injured person, nor the other components of the present invention are shown.

FIGS. 3a and 3b show two different physical situations, hereinafter a) and b), which can correspond however both to a view from the left of FIG. 2. In fact in both these situations the stretcher 8 rotates around the axis 10, which in both cases is perpendicular to the upper face of the same stretcher 8, so that FIG. 2 can represent both those situation.

First of all it should be noted that:
in FIGS. 3a to 5c, the axis g, oriented downwards, is concordant and parallel to the force of gravity vector;
it is presumed that the latter vector is in turn parallel and concordant to the vector of the velocity of the air inside the flow tube, as usually occurs with the helicopter in hover and with a negligible side wind with respect to the velocity induced by the flow tube, so that this axis g can also be defined as "axis of velocity."

The two situations a) and b) are different, in that:
in the first, as can be seen also from FIG. 3a, the stretcher 8, which is shown without the wing for the sake of clarity, is perpendicular to the axis of velocity g;
in the second, instead, as can be seen from FIG. 3b, the stretcher 8 is rotated through an angle β, around the relative roll axis 11, said angle being able to be, for example, of 15 degrees. It is elementary therefore that the perpendicular to the stretcher 8, around which the rotation in fact takes place, is inclined therefore through an angle β equal to 15 degrees with respect to the axis of velocity g. Moreover, solely for the sake of clarity, it is noted that this angle β is equivalent, as can be seen again in FIG. 3b, to that between the plane of the stretcher 8 and the horizontal.

Figure 4A:
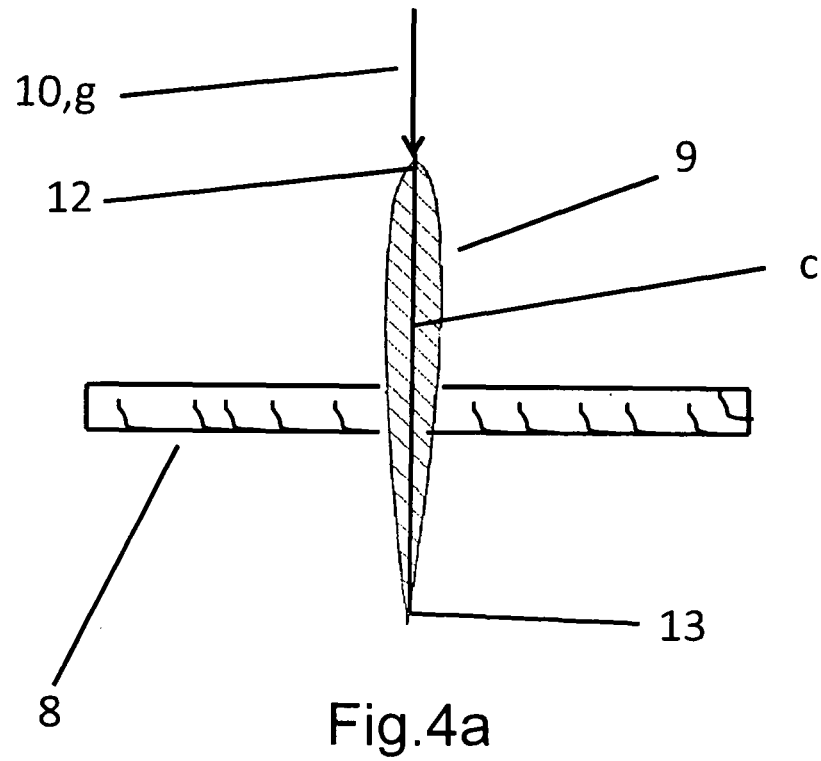
FIGS. 4a and 4b, are equivalent respectively to FIGS. 3a and 3b, yet also illustrate the wing.
Figure 4B:
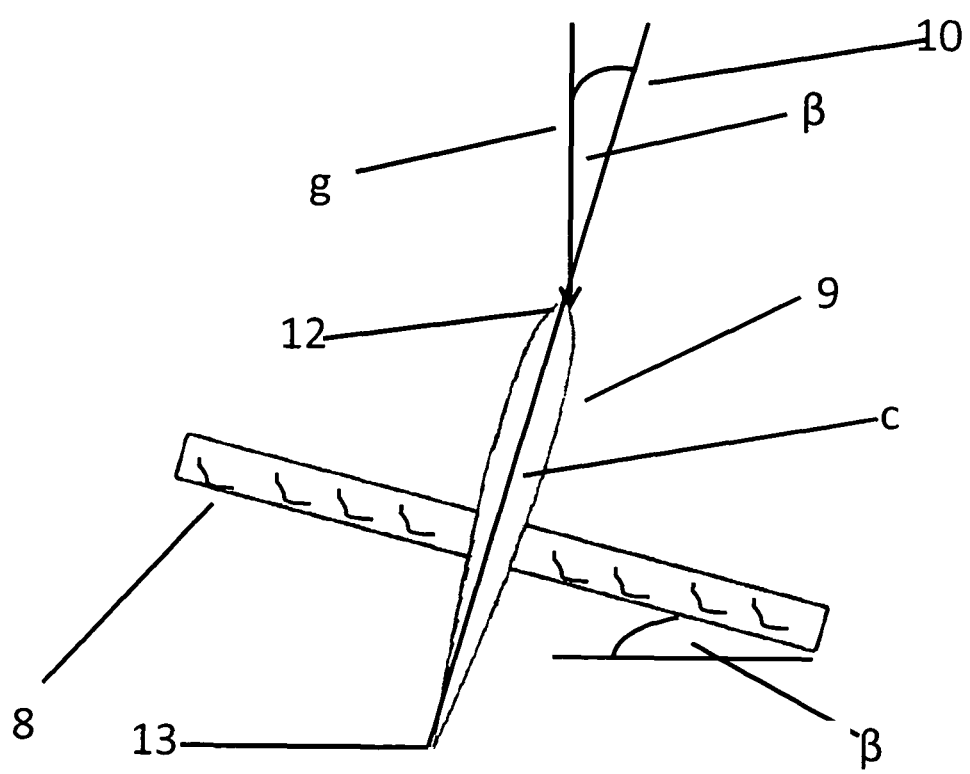

Examining FIGS. 4a and 4b, which are equivalent respectively to FIGS. 3a and 3b, but with the addition of the wing 9, it is clear that, in both situations a) and b), the chord c of the wing 9, whose profile is assumed for the sake of simplicity to be constant and symmetrical, as might be for example a NACA 0012, is aligned with the axis of rotation 10. Said chord c, which, as is known, is the straight line which connects the leading edge 12 with the trailing edge 13 of the profile, is the reference with which the angle of attack of the same profile is to be considered, and therefore in this case of the entire wing 9, with respect to the direction of the velocity g. It is well known in fact that the symmetrical profiles, with zero angle of attack, do not produce lift.

It is supposed, moreover, again for the sole purpose of simplifying the description, that:
the axis of adjustment of the actuator or motor, which is the axis with respect to which this motor sets the angular position of the wing as a function of the signal taken in input, is perpendicular to the upper face of the stretcher 8, and therefore parallel to the axis of rotation 10 of the same;
in both situations 4a and 4b, the chord of the wing is parallel to this axis of adjustment.

It can be directly observed, therefore, that:
in the situation of FIG. 4a, the angle of attack of said wing 9 with respect to the axis of velocity g is zero, in that the chord of the wing is aligned with said axis of velocity g;
in the situation of FIG. 4b the angle of attack of said wing 9 with respect to the axis of velocity g is equal to β, in that the axis of rotation 10, aligned with the chord c of the wing, is inclined, with respect to said axis of velocity g, in fact by an angle equal to β.

Therefore, it is noted that:
in the situation of FIG. 4a, the effective angle of attack of the wing with respect to the velocity corresponds to the angular position of said wing 9 with respect to the axis of adjustment of the motor;
in the situation of FIG. 4b, instead, the two are staggered in fact by an angle equal to β, and therefore in fact 15°.

Starting from these physical situations the primary transducer, which can comprise at least the gyroscope, measures the angular velocity of the stretcher and sends a relative signal in input to the processor, which processes it and in turn sends a signal in output to the system of movement, or motor. At this point it should be noted that, if said signal in output is suitable for making said motor set a certain angle of attack with respect to the velocity, it is preferable that the processor takes into account the direction of this velocity with respect to said axis of adjustment, during the logical-mathematical processing of the signals in input coming from the transducers.

At this point we note that:
starting from the situation of FIG. 4a, in this case the axis of adjustment of the motor being parallel to the axis of velocity g, if the processor sends a signal to the motor, corresponding to a required inclination α of the wing 9 equal, for example, to 10°, this motor consequently arranges it with an inclination of 10° with respect to the velocity, as shown in FIG. 4a, or at least acts to this end;
starting from the situation 4b, instead, the processor must take account of the direction of the velocity g, in that what matters is to obtain an inclination α of the wing 9 with respect to this direction of the velocity g, and not with respect to the axis of adjustment of the motor.

Therefore, summing up, the processor, through the acceleration data that arrive from the accelerometer, traces the inclination of the force of gravity, and therefore of the velocity, with respect to the axis of adjustment of the motor, and sends a signal in output, towards the same motor. Said signal in output has to be corresponding to a certain final angular position of the wing 9 with respect to said axis of adjustment, and said final angular position must in turn correspond to a certain angle of attack α of the same wing 9, with respect to the velocity of the air.

Figure 5A:
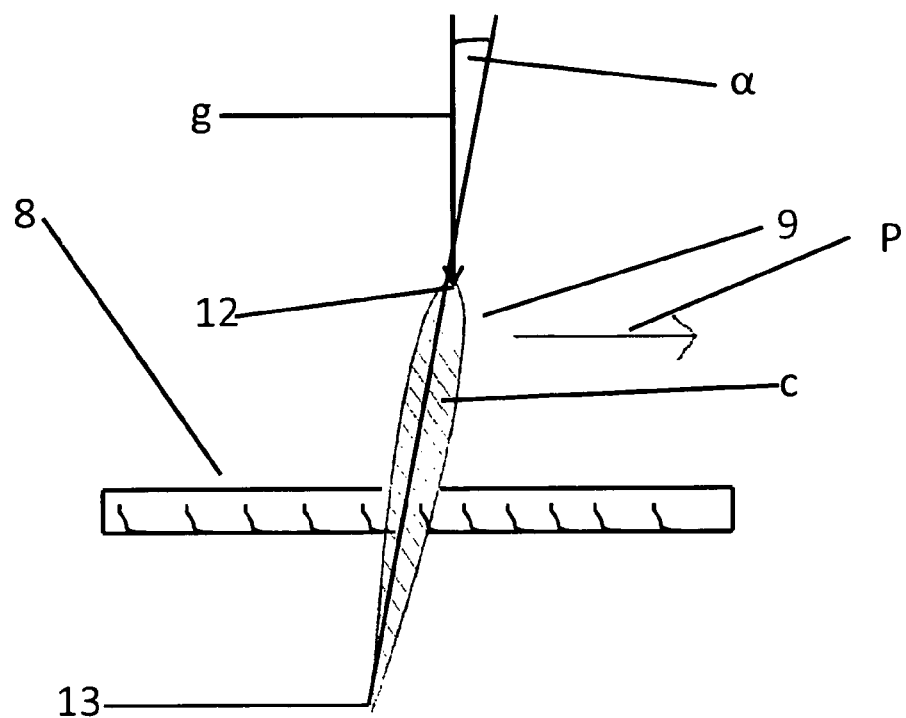
FIGS. 5a and 5b are two side views of the stretcher together with the wing, the latter with modified angle of attack, respectively, compared to the situations as per FIGS. 4a and 4b, on the instructions of the system of stabilisation.
Figure 5B:
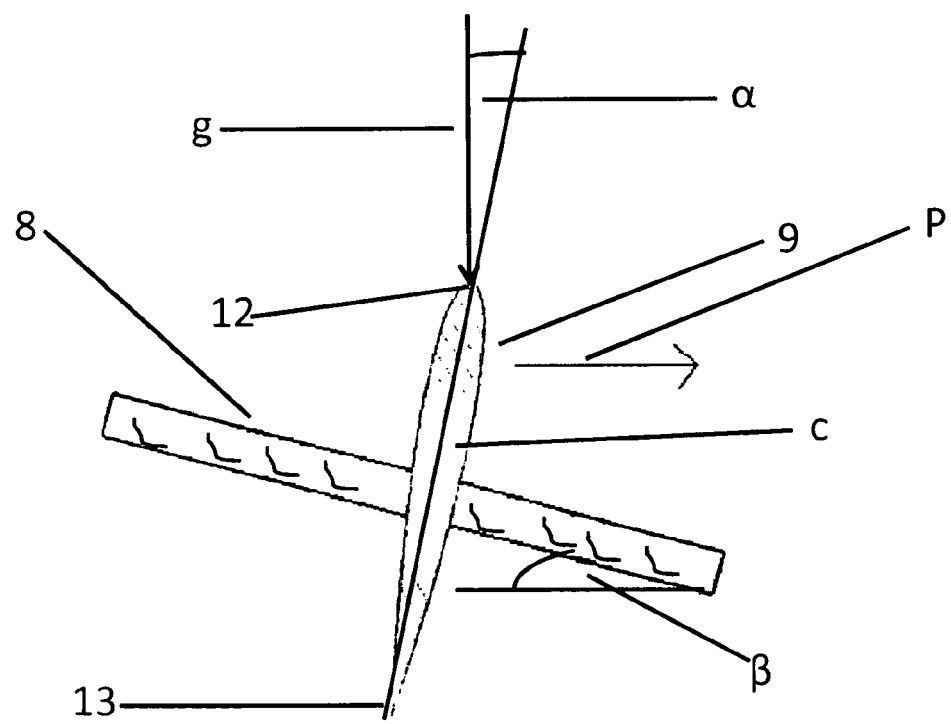

In FIGS. 5a and 5b, the wing 9 is shown, respectively, in situations a) and b), once it has been rotated by the motor until having an incidence α of 10 degrees with respect to the velocity of the air. It can be noted that the difference between the two situations differs only by the inclination β of the stretcher with respect to the horizontal.

However, the following can be noted:
in order to change from the situation of FIG. 4a to that of FIG. 5a, the motor has rotated said wing 9 through 10 degrees in a clockwise direction;
in order to change from the situation of FIG. 4b to that of FIG. 5b, the motor has rotated the wing 9 through 5 degrees in an anticlockwise direction, in order to achieve in any case the same final effect, which is that of having an angle of attack of the wing equal to 10°, with respect to the velocity of the air g. In the latter case, in fact, the wing started, due to the effect of the attitude of the stretcher 8, already from an angle of attack of 15°.

Figure 6:
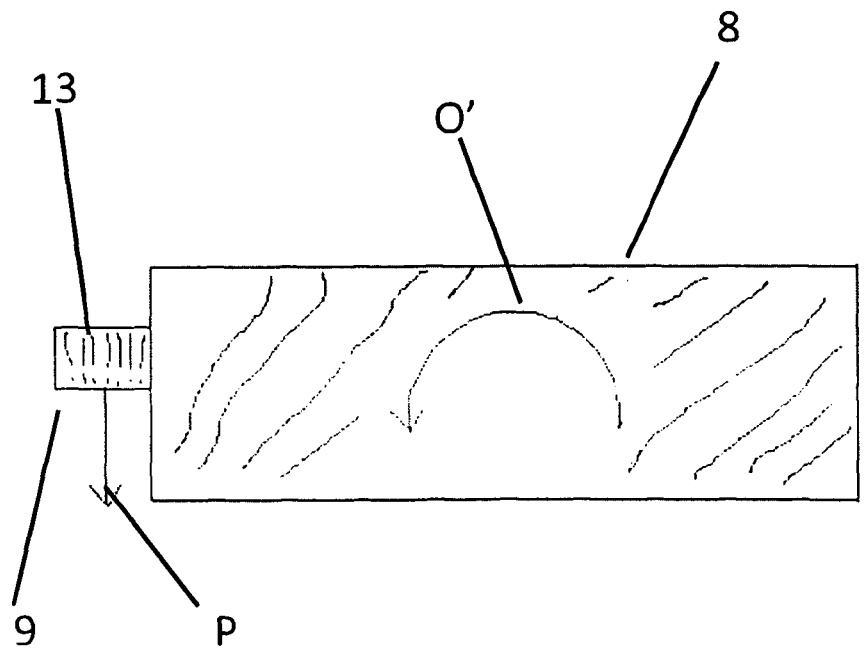
FIG. 6 shows a view oriented like that of FIG. 2, yet which shows the physical effect of said system of stabilisation.

As shown in FIGS. 5a, 5b and 6, this inclination α generates, very roughly, a force P acting on the wing and at least partially also on the remaining part of the suspended load, said wing being at least partially restrained, with known means, to said suspended load. Said force P, which can be considered as applied in the centre of pressure of the wing, tends to exert a moment, for example with respect to the centre of mass of the stretcher, or in any case of the whole suspended load and said moment thends to rotate the latter in the direction of the arrow O' as per FIG. 6, and therefore contrary to the direction of rotation O of FIG. 2, thus determining a reduction in the angular velocity of the stretcher 8, or of at least part of the suspended load. In this FIG. 6 the wing and the stretcher 8 are shown from above, and the trailing edge 13 of the wing 9 is noted, visible in fact due to the inclination of said wing 9.

Figure 5C:
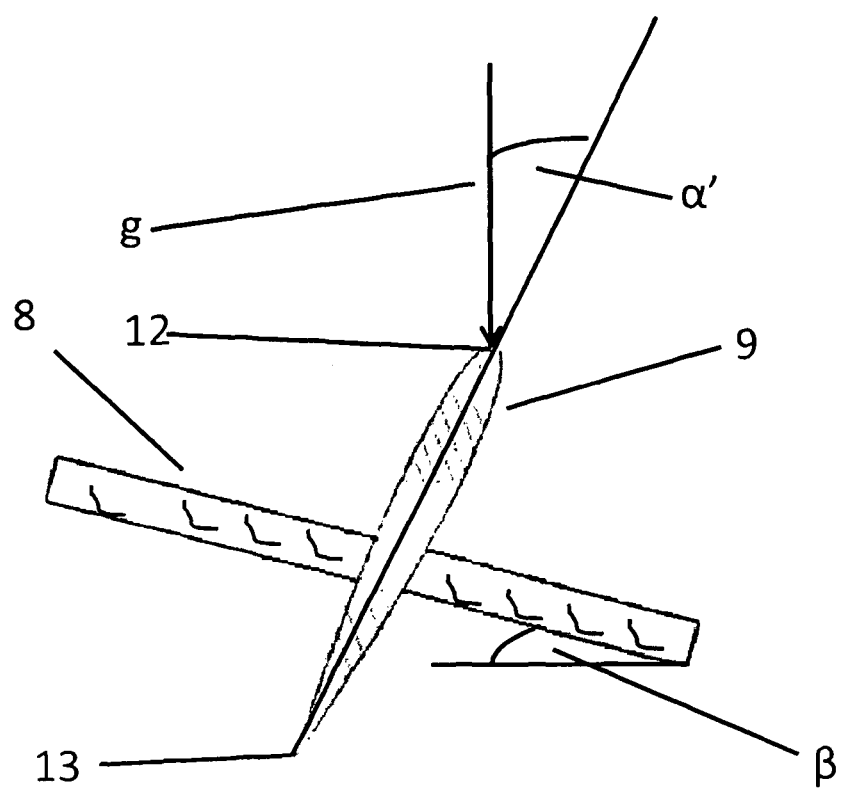
FIG. 5c is a side view of the stretcher together with the wing, the latter with angle of attack modified with respect to the situation of FIG. 4b, yet in this case without the secondary transducer.

If, starting from the situation of FIG. 4b, and in the absence of the accelerometer, the processor were to send, only on the base of the signal from the gyroscope, the same signal in output relative to the situation of FIG. 4a, said signal in output would cause a rotation of the wing 9 through 10 degrees clockwise, up to an angle of attack α' of 25 degrees, as shown in FIG. 5c. If the wing were to have a limit of incidence of stall of 20 degrees, for example, a much smaller, even zero, force P would be generated, with the consequent inefficiency of the system of stabilisation, which could even have a destabilising effect.

Figure 7:
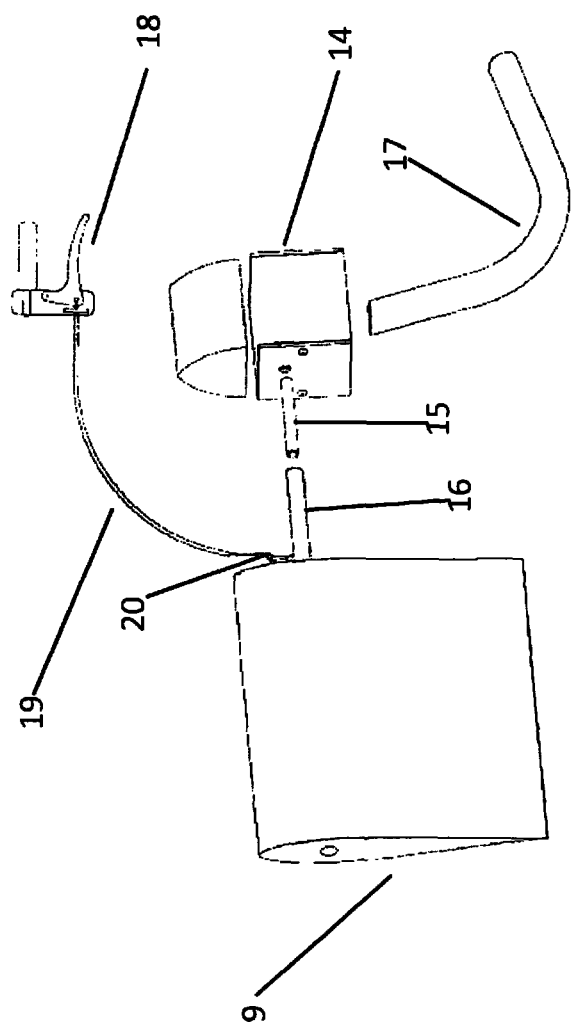
FIG. 7 shows a blown-up view of the main construction components of the system of stabilisation.

FIG. 7 shows a blown-up view of some components of the system of stabilisation. The wing 9 and the box 14 which contains the processor, the transducers, any batteries and the motor can be noted, all components known and not shown because internal to said box 14. The shaft of the motor 15 protrudes from said box 14, to hook up with the shaft of the wing 16, which is integral and passing internally to the same wing 9. The two shafts, of the motor 15 and of the wing 16, are at least partially constrained to rotate together, preferably by means of a peg 20 passing at least partially through both, and suitable for keeping them at least partially restrained.

This embodiment also provides a system for the at least partial emergency release of the wing 9 from the system of stabilisation, which is at least partially restrained in a known manner to the stretcher, preferably by means of at least one arm 17. Said release system is composed of a lever 18 connected to a wire 19, which, upon appropriate movement of said lever 18, moves said peg 20, so as to release the shaft of the motor 15 from that of the wing 16.

The wing 9 at this point is loose, that is to say free to rotate on the motor shaft 15, losing efficacy but still being able to exert a damping or amplifying effect on the speed of rotation of the suspended load. Alternatively the shaft of the wing 9, together with the wing 9 itself, can be also expelled outwards by an appropriate spring, which is functionally interposed between said shafts, and which is compressed with respect to the position of equilibrium, as well as prevented from acting, when said peg 20 is in active position, that is to say restrains said shaft of the motor 15 to said shaft of the wing 16. Said spring, free to act once this aerodynamic means is released from the rest of the system of stabilisation, pushes outwards the first of these with respect to the second.

The emergency release system can also be constituted, but not only, by magnetic and/or electrical connections, as well as physical only, with possible remote control, also from the ground or on board the helicopter, by known means.

Changes may be made regarding the construction and/or inherent in the possible method of use, and therefore to the relative control system, in any case coming within the scope of protection of the present application, according to what is expressed by the claims.

The invention claimed is:

1. Automatic system of stabilisation of the speed of rotation of at least one suspended load attached to a helicopter, characterised in that:
   said automatic system comprises at least one wing (9), said at least one wing (9) being at least partially restrained to said at least one suspended load;
   said automatic system comprises at least one system of movement capable of moving at least part of said at least one wing (9);
   said automatic system comprises at least one angular velocity sensor, here defined as a primary sensor;
   said automatic system comprises at least one software or computer program;
   said automatic system comprises at least one processor whereon said at least one software is installed; and
   said at least one system of movement is a motor or actuator.

2. Automatic system of stabilisation of the rotation of said at least one suspended load according to claim 1 characterised in that said at least one system of movement is at least partially with artificial power supply, and in that it comprises at least the following components:
   at least one conversion device associated to said primary sensor, the combination of said primary sensor and conversion device constituting a primary transducer;
   said primary transducer being at least partially restrained to said at least one suspended load; and
   at least one means of communication at least partially electrical and/or electronic and/or computer, suitable for allowing the reciprocal interface or interaction, at least of one of the following pairs of components:
   said at least one processor and said primary transducer; and
   said at least one processor and said at least one system of movement.

3. Automatic system of stabilisation of the rotation of said at least one suspended load according to claim 1, characterised in that it comprises at least the following additional components:
at least one other sensor, here defined as secondary sensor;
at least one conversion device associated to said secondary sensor, the combination of said secondary sensor and conversion device constituting a transducer defined here as secondary, which can also be combined with a primary transducer in a single transducer;
said secondary transducer being at least partially restrained to said at least one suspended load; and
at least one means of communication at least partially electrical and/or electronic and/or computer, suitable for allowing the interaction or the interface at least between said secondary transducer and said at least one system of movement.

4. Automatic system of stabilisation of the rotation of said at least one suspended load according to claim 1, characterised in that:
said at least one system of movement motor, is able to rotate at least part of said at least one wing (9), by means of at least one member at least partially restrained to said at least one motor, which is a shaft, here defined as at least one motor shaft (15);
said at least one member is at least partially restrained to at least one structural component (16), which is relative to said at least one wing (9) and/or at least partially restrained to it;
said software operates at least partially via at least one programming language;
said primary sensor is a gyroscope or the like; and
at least one means of communication is constituted, at least in part, by any analogue/digital or digital/analogue converter.

5. Automatic system of stabilisation of the rotation of said at least one suspended load according to claim 1, characterised in that:
said at least one wing (9) is constituted at least partially by at least one wing (9), characterised at least in part by a certain aerodynamic profile;
said at least one system of movement is able to rotate at least part of said at least one wing (9), by means of at least one member at least partially restrained to said at least one motor, which is a shaft, here defined as at least one motor shaft (15);
said at least one member is at least partially restrained to at least one structural component (16), which is relative to said at least one wing (9) and/or at least partially restrained to it;
said software operates at least partially via at least one programming language;
said primary sensor is a gyroscope;
at least one means of communication is constituted, at least in part, by any analogue/digital or digital/analogue converter; and
said secondary sensor is an accelerometer or the like.

6. Automatic system of stabilisation of the rotation of at least one suspended load according to any one of claim 4 or 5, characterised in that it comprises at least one system of at least partial emergency release of said at least one wing (9), able to reciprocally disengage said at least one motor shaft (15) and structural component (16), and at least one spring, functionally interposed between said at least one motor shaft (15) and structural component (16), said spring being able to push outwards said at least one wing (9), with respect to the rest of the system of stabilisation and once disengaged from the same.

7. Automatic system of stabilisation of the rotation of at least one suspended load according to any one of claim 4 or 5, characterised in that:
said system comprises at least one system of at least partial emergency release of said at least one wing (9), able to reciprocally disengage said at least one motor shaft (15) and structural component (16), and at least one spring, functionally interposed between said at least one motor shaft (15) and structural component (16), said spring being able to push outwards said at least one wing (9), with respect to the rest of the system of stabilisation and once disengaged from the same; and
said at least partial emergency release of said at least one wing (9) displaces appropriately at least one peg (20) or other element equivalent to it, suitable for maintaining reciprocally joined said at least one motor shaft (15) and structural component (16), said peg (20) being passing at least partially in both, and in that said spring is compressed with respect to the position of equilibrium and prevented from acting when said peg (20) reciprocally restrains said at least one motor shaft (15) and structural component (16) of the at least one wing (9).

8. Method for the use of the automatic system of stabilisation of the rotation of said at least one suspended load as claimed in any one of claims 2 to 5, characterised in that it performs, cyclically and/or repeatedly, at least one of the following phases:
said primary transducer senses, and therefore detects, at least part of at least one component of a vector, which is at least partially dependent, mathematically and/or physically, at least on one component of the angular velocity vector of at least part of said at least one suspended load;
at least part of the detection of said primary transducer, possibly converted into a signal, electrical and/or electronic, is sent towards the processor, as a primary input signal;
the processor processes, at least mathematically and/or logically, at least part of said primary input signal, possibly appropriately converted into digital form;
the processor, therefore on the basis at least of part of said primary input signal, sends at least one output signal towards the at least one system of movement;
on the basis at least of part of said at least one output signal, possibly appropriately converted into analogue form, said at least one system of movement rotates, with respect to at least one flow of air, at least part of said at least one wing (9);
a variation is generated of at least part of the aerodynamic stresses acting on said at least one wing (9), consequent to the movement of the same imparted by said at least one system of movement;
at least part of said aerodynamic stresses, as a result at least of this variation, exert, overall, at least one moment on said at least one suspended load, for example with respect to the centre of mass of the latter;
said at least one moment determines at least one reduction, of the absolute value of at least one component of the angular velocity vector of at least part of this at least one suspended load; the latter component being at least partially linked, physically and/or mathematically, at least to the component of angular velocity initially sensed by said primary transducer;

said method, cyclically and/or repeatedly, being able to also carry out all these phases, at least partially in the sequence presented, or at least two of these phases, the latter two phases also possibly being:

at least partly simultaneous;

and/or at least partially in the sequence presented;

and/or also separated by another phase, in this sequence, the latter another phase being able to be absent in said method.

9. Method for the use of the automatic system of stabilisation of the rotation of at least one suspended load as claimed in claim 3 or 5, characterised in that it performs, cyclically and/or repeatedly, at least one of the following phases:

said primary transducer senses, and therefore detects, at least part of at least one component of a vector, which is at least partially dependent, mathematically and/or physically, at least on one component of the angular velocity vector of at least part of said at least one suspended load;

at least part of the detection of said primary transducer, possibly converted into a signal, electrical and/or electronic, is sent towards the processor, as a primary input signal;

the secondary transducer senses, and therefore detects, at least part of at least one component of a physical quantity, which is vectorial, which is at least partially dependent on the inclination, and/or on the orientation, of the velocity vector of at least part of the air which impacts at least partially said at least one wing (9), said inclination and/or orientation being with respect to a reference direction integral with at least part of the latter, or in any case the latter physical quantity being able to be at least partially dependent, physically and/or mathematically, on at least one physical event regarding at least part of said at least one wing (9);

at least part of the detection of said secondary transducer, possibly converted into a signal, electrical and/or electronic, is sent towards the processor, as a secondary input signal;

the processor processes, at least mathematically and/or logically, at least part of said primary and secondary input signals, possibly appropriately converted into digital form;

the processor, therefore on the basis at least of part of said primary and secondary input signals, sends at least one output signal, which may be in digital form, towards the means of movement;

on the basis at least of part of said output signal, said at least one system of movement rotates, with respect to at least one flow of air, at least part of said at least one wing (9);

a variation is generated of at least part of the aerodynamic stresses acting on said at least one wing (9), consequent to the movement of the same imparted by said at least one system of movement;

at least part of said aerodynamic stresses, as a result at least of this variation, exert, overall, at least one moment on the at least one suspended load, for example with respect to the centre of mass of the latter;

said at least one moment determines at least one reduction, of the absolute value of at least one component of the angular velocity vector of at least part of this at least one suspended load; the latter component being at least partially linked, physically and/or mathematically, at least to the component of angular velocity initially sensed by said primary transducer;

said method, cyclically and/or repeatedly, being able to also carry out all these phases, at least partially in the sequence presented, or at least two of these phases, the latter two phases also possibly being:

at least partly simultaneous;

and/or at least partially in the sequence presented;

and/or also separated by another phase in this sequence, the latter another phase being able to be absent in said method.

10. Method for the use of the automatic system of stabilisation of the rotation of at least one suspended load as claimed in claim 3 or 5, characterised in that it performs, cyclically and/or repeatedly, at least one of the following phases:

said primary transducer senses, and therefore detects, at least part of at least one component of a vector, which is at least partially dependent, mathematically and/or physically, at least on one component of the angular velocity vector of at least part of said at least one suspended load;

at least part of the detection of said primary transducer, possibly converted into a signal, electrical and/or electronic, is sent towards the processor, as a primary input signal;

the secondary transducer senses, and therefore detects, at least part of at least one component of a physical quantity, which can be vectorial, which is at least partially dependent on the inclination, and/or on the orientation, of the velocity vector of at least part of the air which impacts at least partially said at least one wing (9), said inclination and/or orientation being with respect to a reference direction integral with at least part of the latter, or in any case the latter physical quantity being able to be at least partially dependent, physically and/or mathematically, on at least one physical event regarding at least part of said at least one wing (9);

at least part of the detection of said secondary transducer, possibly converted into a signal electrical and/or electronic, is sent towards the processor, as a secondary input signal; said part detected by the secondary transducer being at least part of at least one component of a vector, which is at least partly dependent, mathematically and/or physically, at least on one component of the acceleration vector of at least one point of the at least one suspended load;

the processor processes, at least mathematically and/or logically, at least part of said primary and secondary input signals, possibly appropriately converted into digital form;

the processor, therefore on the basis at least of part of said primary and secondary input signals, sends at least one output signal, which may be in digital form, towards the means of movement;

on the basis at least of part of said output signal, said at least one system of movement rotates, with respect to at least one flow of air, at least part of said at least one wing (9);

a variation is generated of at least part of the aerodynamic stresses acting on said at least one wing (9), consequent to the movement of the same imparted by said at least one system of movement;

at least part of said aerodynamic stresses, as a result at least of this variation, exert, overall, at least one moment on the at least one suspended load, for example with respect to the centre of mass of the latter;

said at least one moment determines at least one reduction, of the absolute value of at least one component of the angular velocity vector of at least part of this at least one suspended load; the latter component being at least partially linked, physically and/or mathematically, at least to the component of angular velocity initially sensed by said primary transducer;

said method, cyclically and/or repeatedly, being able to also carry out all these phases, at least partially in the sequence presented, or at least two of these phases, the latter two phases also possibly being:

at least partly simultaneous;

and/or at least partially in the sequence presented;

and/or also separated by another phase in this sequence, the latter another phase being able to be absent in said method.

11. Method for the use of the automatic system of stabilisation of the rotation of at least one suspended load as claimed in claim 3 or 5, characterised in that it performs, cyclically and/or repeatedly, at least one of the following phases:

said primary transducer senses, and therefore detects, at least part of at least one component of a vector, which is at least partially dependent, mathematically and/or physically, at least on one component of the angular velocity vector of at least part of said at least one suspended load;

at least part of the detection of said primary transducer, possibly converted into a signal, electrical and/or electronic, is sent towards the processor, as a primary input signal;

the secondary transducer senses, and therefore detects, at least part of at least one component of a physical quantity, which can be vectorial, which is at least partially dependent on the inclination, and/or on the orientation, of the velocity vector of at least part of the air which impacts at least partially said at least one wing (9), said inclination and/or orientation being with respect to a reference direction integral with at least part of the latter, or in any case the latter physical quantity being able to be at least partially dependent, physically and/or mathematically, on at least one physical event regarding at least part of said at least one wing (9);

at least part of the detection of said secondary transducer, possibly converted into a signal electrical and/or electronic, is sent towards the processor, as a secondary input signal;

the processor processes, at least mathematically and/or logically, at least part of said primary and secondary input signals, possibly appropriately converted into digital form by using the detection of the secondary sensor in order to determine, at least approximately, at least the direction of at least part of at least one component of the velocity vector of at least part of the flow of air, which impacts at least part of said at least one wing (9);

the processor, therefore on the basis at least of part of said primary and secondary input signals, sends at least one output signal, which may be in digital form, towards the means of movement;

on the basis at least of part of said output signal, said at least one system of movement rotates, with respect to at least one flow of air, at least part of said at least one wing (9);

a variation is generated of at least part of the aerodynamic stresses acting on said at least one wing (9), consequent to the movement of the same imparted by said at least one system of movement;

at least part of said aerodynamic stresses, as a result at least of this variation, exert, overall, at least one moment on the at least one suspended load, for example with respect to the centre of mass of the latter;

said at least one moment determines at least one reduction, of the absolute value of at least one component of the angular velocity vector of at least part of this at least one suspended load; the latter component being at least partially linked, physically and/or mathematically, at least to the component of angular velocity initially sensed by said primary transducer;

said method, cyclically and/or repeatedly, being able to also carry out all these phases, at least partially in the sequence presented, or at least two of these phases, the latter two phases also possibly being:

at least partly simultaneous;

and/or at least partially in the sequence presented;

and/or also separated by another phase in this sequence, the latter another phase being able to be absent in said method.

12. Method for the use of the automatic system of stabilisation of the rotation of at least one suspended load as claimed in any one of claims 2 to 5, characterised in that it by means of said automatic system, on the basis at least of the size at least of a part of at least one component of angular velocity of said at least one suspended load, said size being sensed by said primary sensor, a physical action is automatically generated, through the interaction between said at least one wing and the flow tube located downstream of the blades of said helicopter and, by means of said processor, said physical action being a moment or torque on at least part of said at least one suspended load, tending to stabilise, and to decrease, the speed of rotation of the same at least one suspended load.

* * * * *